United States Patent
Wada et al.

(10) Patent No.: US 6,278,474 B1
(45) Date of Patent: Aug. 21, 2001

(54) IMAGE FORMING APPARATUS PROVIDED WITH A PLURALITY OF LIGHT SIGNAL EMITTING HEADS

(75) Inventors: Kenichi Wada, Takatsuki; Itaru Saito, Nishinomiya; Ken Matsubara, Takatsuki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/159,694

(22) Filed: Sep. 24, 1998

(30) Foreign Application Priority Data

Sep. 26, 1997 (JP) .................................................. 9-262307

(51) Int. Cl.⁷ .................................................. B41J 15/14
(52) U.S. Cl. ............................................. 347/241; 347/256
(58) Field of Search .................................... 347/234, 248, 347/262, 264, 239, 238, 241, 256; 355/67, 72, 74, 1; 399/27

(56) References Cited

U.S. PATENT DOCUMENTS

| | | | |
|---|---|---|---|
| 4,524,372 | 6/1985 | De Cock et al. | 347/238 |
| 4,806,965 | * 2/1989 | Yamanouchi et al. | 355/1 |
| 4,887,104 | 12/1989 | Kitano et al. | 359/246 |
| 5,084,729 | * 1/1992 | Yakubo et al. | 355/74 |
| 5,331,377 | * 7/1994 | Matsuura et al. | 399/27 |
| 5,430,523 | 7/1995 | Tanibata et al. | 355/32 |
| 5,488,450 | 1/1996 | Tanibata | 355/38 |
| 5,489,950 | * 2/1996 | Yamakawa | 348/744 |
| 5,923,358 | * 7/1999 | Yamakawa | 347/238 |
| 5,982,407 | * 11/1999 | Enomoto et al. | 347/239 |

* cited by examiner

Primary Examiner—N. Le
Assistant Examiner—Hai C. Pham
(74) Attorney, Agent, or Firm—McDermott, Will & Emery

(57) ABSTRACT

An image forming apparatus which is capable of composing an image with a high accuracy on an image receiving member with use of a plurality of light signal emitting heads. The image forming apparatus, which is used for forming an image on the image receiving member such as a photographic paper or a electrophotographic photosensitive member. Each light signal emitting head turns on and off a plurality of light signal emitting elements extending in a main scanning direction in accordance with image data. The image receiving member is guided by a cylindrical guide roller with being adhered to the curving section of the guide roller at an exposure position. The light emergent from each light signal emitting head is changed its optical path at a dichroic prism or a half mirror and exposes the image receiving member linearly.

21 Claims, 13 Drawing Sheets

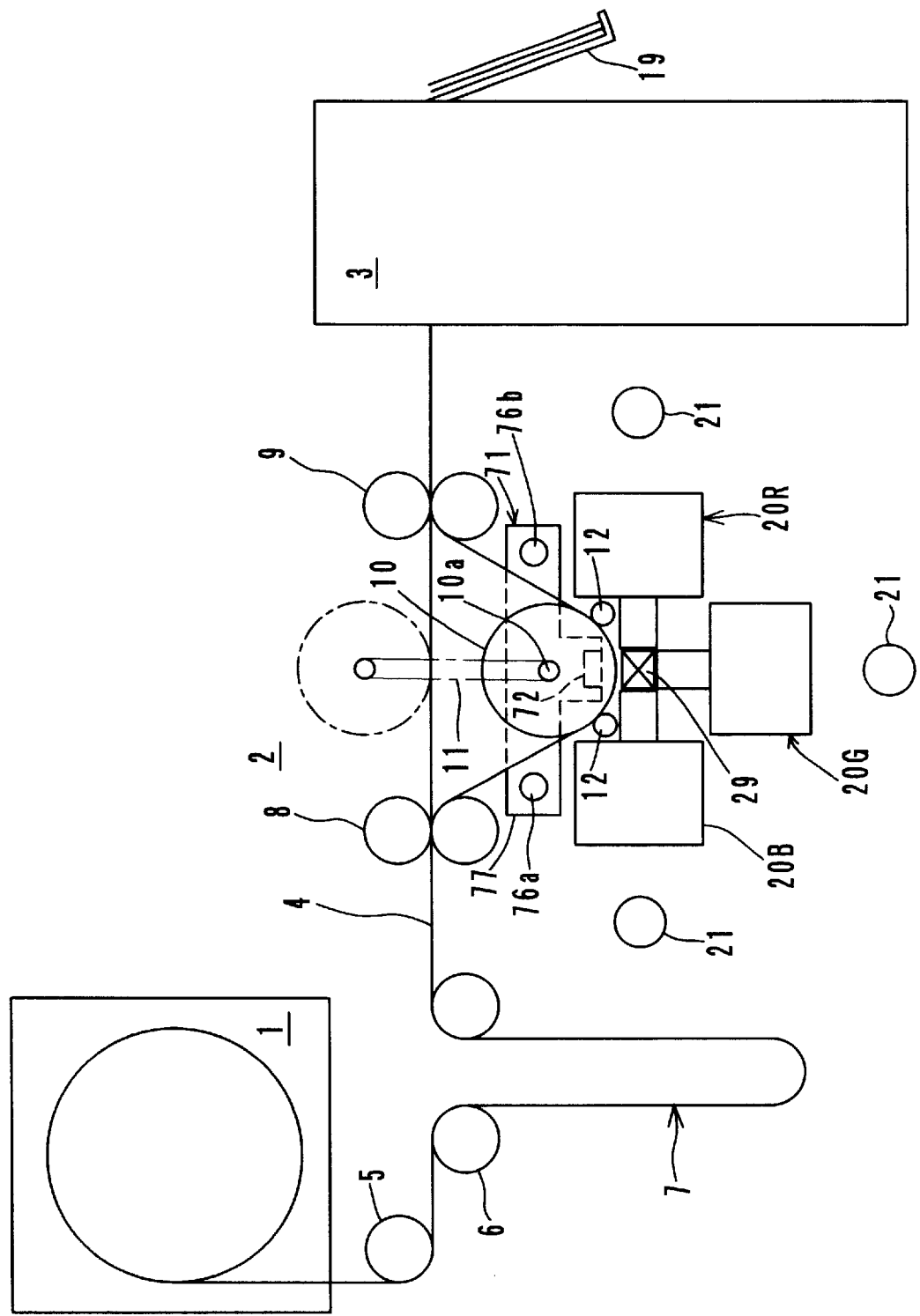

F I G. 3
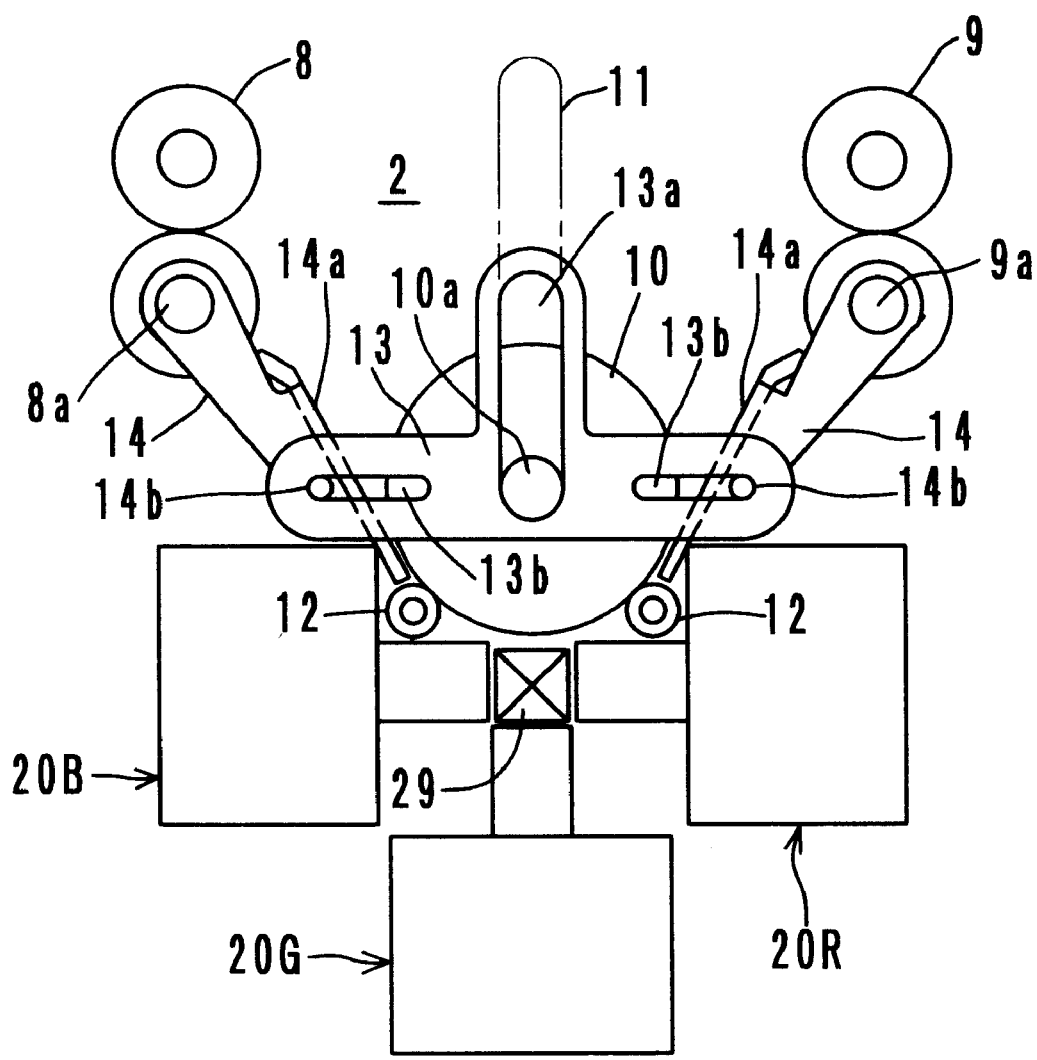

F I G. 4
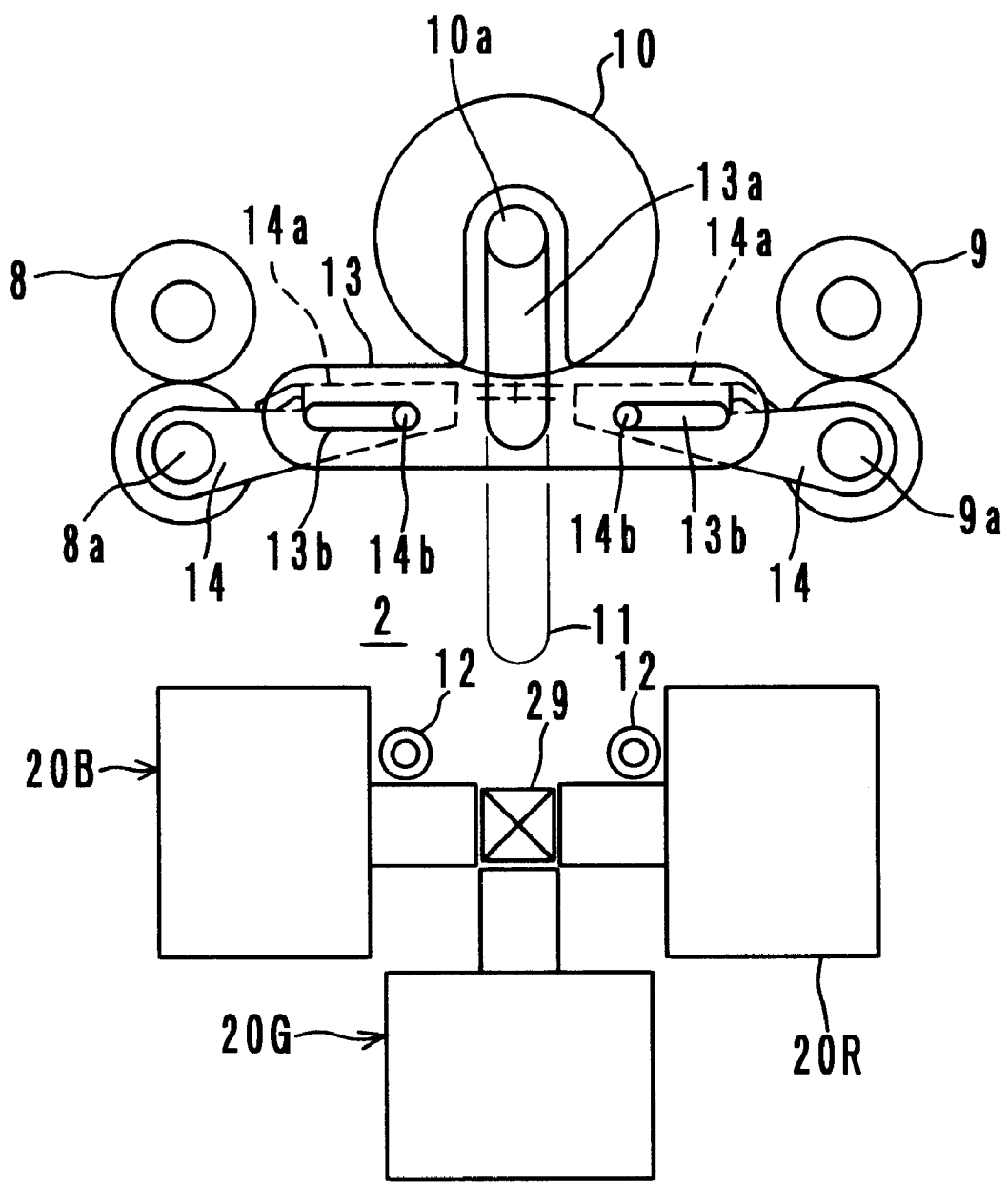

F I G. 1 3
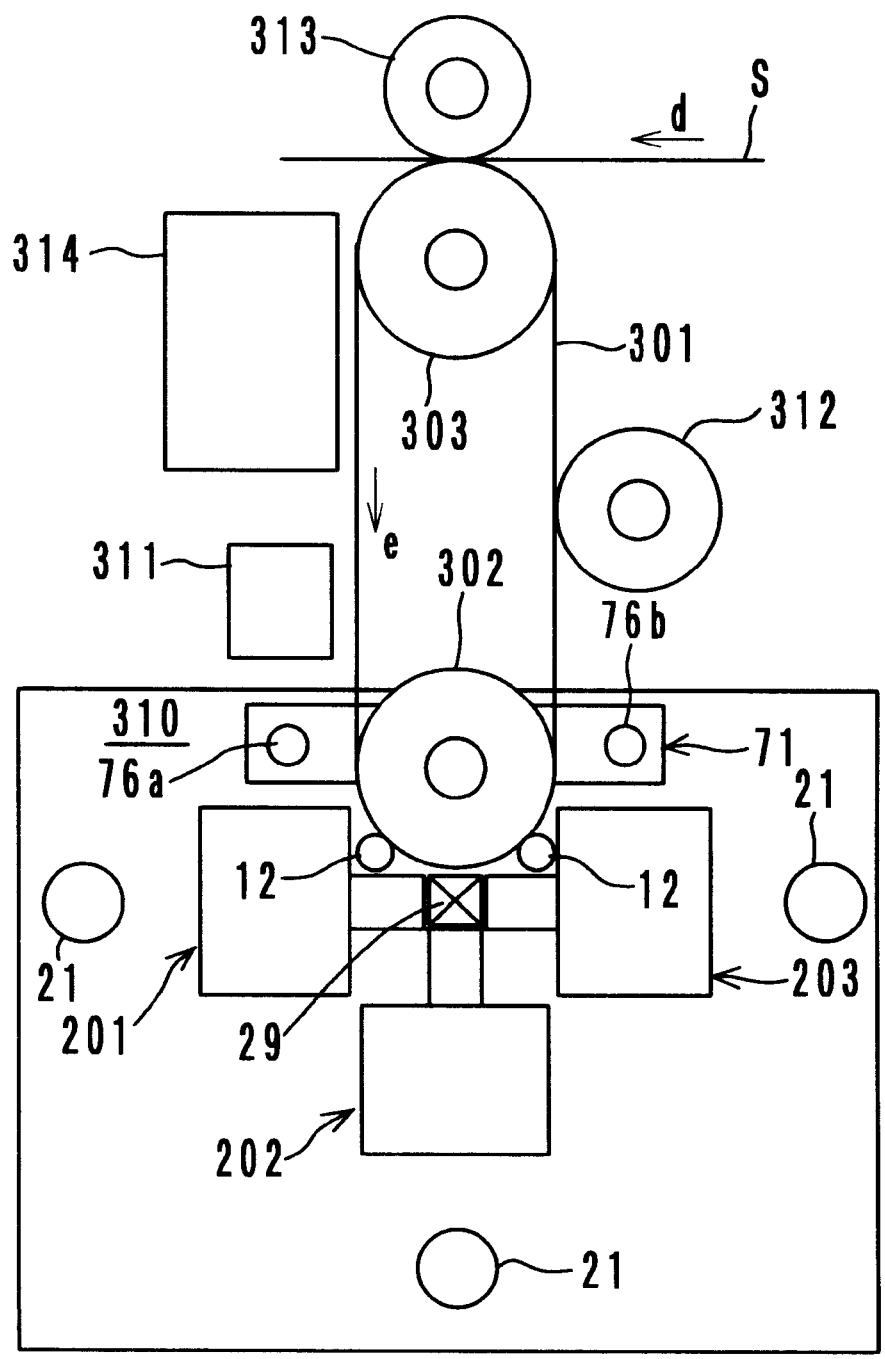

IMAGE FORMING APPARATUS PROVIDED WITH A PLURALITY OF LIGHT SIGNAL EMITTING HEADS

This application is based on application No. 9-262307 filed in Japan, the contents of which are hereby incorporated by reference.

BACKGROUND OF THE INVENTION

1. Field of the Invention

The present invention relates to an image forming apparatus which forms an image (electrostatic latent image) on a photographic recording medium such as photosensitive material, photosensitive member, or the like by using an optical write head having a light shutter array made of PLZT or a LED array.

2. Description of Related Art

Conventionally, various kinds of optical write heads which turn on and off light for each pixel with use of a light shutter array made of PLZT or an LED array have been used to form images (electrostatic latent images) on a silver-salt print sheet or film or an electrophotographic photosensitive member. Also, in order to realize an image forming at high speed, an image forming apparatus which has three optical write heads has been disclosed (refer to U.S. Pat. No. 5,488,450).

In the image forming apparatus with three optical write heads, a tandem method is adopted; which is, with three optical write heads arranged in row in the sub scanning direction, an image is composed and recorded on a recording medium being carried flat by exposing one by one with specified time lag. However, the apparatus of tandem method has problems: it is difficult to carry the recording meidum flat at high accuracy; and, an extra control is needed in order to synchronize three exposure positions, and operation of the control is complicated.

On the other hand, an optical write head, in order to form high-quality images without unevenness, needs to be subjected to measurement of the quantity of light outputted from each element and to correction in quantity of light according to the measurement result. Conventionally, an optical write head is fitted in a jig before it is built in an image forming apparatus, and the quantity of light outputted from each element is measured by a light-quantity measuring device with a photosensor; then, correction date are produced based on the result of the measurement. However, those correction data are effective only in the early time of building the optical write head in an apparatus, and are not useful when the output characteristic of each light element changes because of aging and/or a change in environmental conditions. That is, a real-time light-quantity correction for three optical write heads has not been achieved in the present condition.

SUMMARY OF THE INVENTION

An object of the present invention is to provide an image forming apparatus which is capable of composing and recording an image at high accuracy on an image receiving member with use of a plurality of light signal emitting heads.

Another object of the present invention is to provide an image forming apparatus which is capable of measuring the quantity of light outputted from a plurality of light signal emitting heads as necessary and producing correction data at real time so as to produce high-quality images constantly.

In order to attain the objects above, an image forming apparatus in accordance with the present invention comprises: a plurality of light signal emitting heads which control turn-on and -off of a plurality of optical elements extending in a main scanning direction individually responsive to an image data; an optical path changing member which leads light emergent from the light signal emitting heads to align on a substantially same line; and a guiding member which guides on its arced curving section an image receiving member which moves in a sub scanning direction on an image focusing position of the light guided by the optical path changing member.

According to the present invention, the image receiving member, with being adhered to the curving section of the guiding member, is guided to move in the sub scanning direction at the exposure position; thus, the receiving position of the image receiving member is accurately located. Moreover, since light emergent from a plurality of light signal emitting heads are led to align on the substantially same line by the optical path changing member, image composing position is also accurately located; thus high-quality image can be realized at high accuracy.

In accordance with the present invention, it is preferable that the exposure position is adjustable responding to the thickness of the image receiving member. For that purpose, it is proper to provide a means for adjusting the exposure position which displaces either the guiding member or the light signal emitting head.

Further, the image forming apparatus in accordance with the present invention has a holder for holding the guiding member wherein the guiding member can move toward or away from the exposure position. By moving away the guiding member from the exposure position, the image receiving member can be set easily. Also, by further providing a positioning member for touching and stopping the guiding member through the image receiving member when the guiding member is set on the exposure position, the image receiving member is accurately set on the exposure position corresponding to the thickness thereof.

Furthermore, the image forming apparatus in accordance with the present invention comprises a light-quantity measuring unit which moves a light-receiving element for receiving light emergent from each of the light signal emitting heads in the main scanning direction when the guiding member is set aside from the exposure position. The light-quantity measuring unit, as moving in the main scanning direction, measures the light quantity outputted from each optical element of the light signal emitting head, and simultaneously produces light-quantity correction data which will be fed back when image-forming. In the image forming apparatus, since the light-quantity measuring unit is built in the apparatus, it is possible to measure light quantity at desired time and renew the correction data; thus, it can properly cope with a change in output characteristic of the optical elements because of aging and/or a change in environmental conditions.

BRIEF DESCRIPTION OF THE DRAWINGS

These and other objects and features of the present invention are apparent from the following description with reference to the accompanying drawings, in which:

FIG. 1 is a schematic view of a color printer of the first embodiment of the present invention;

FIG. 3 is a front view of an exposing station of the color printer wherein a guide roller is set on an exposure position;

FIG. 4 is a front view of the exposing station wherein the guide roller is set on a side position;

FIG. 13 is a schematic view of a printer of the second embodiment of the present invention.

DETAILED DESCRIPTION OF THE PREFERRED EMBODIMENTS

Figure 2:
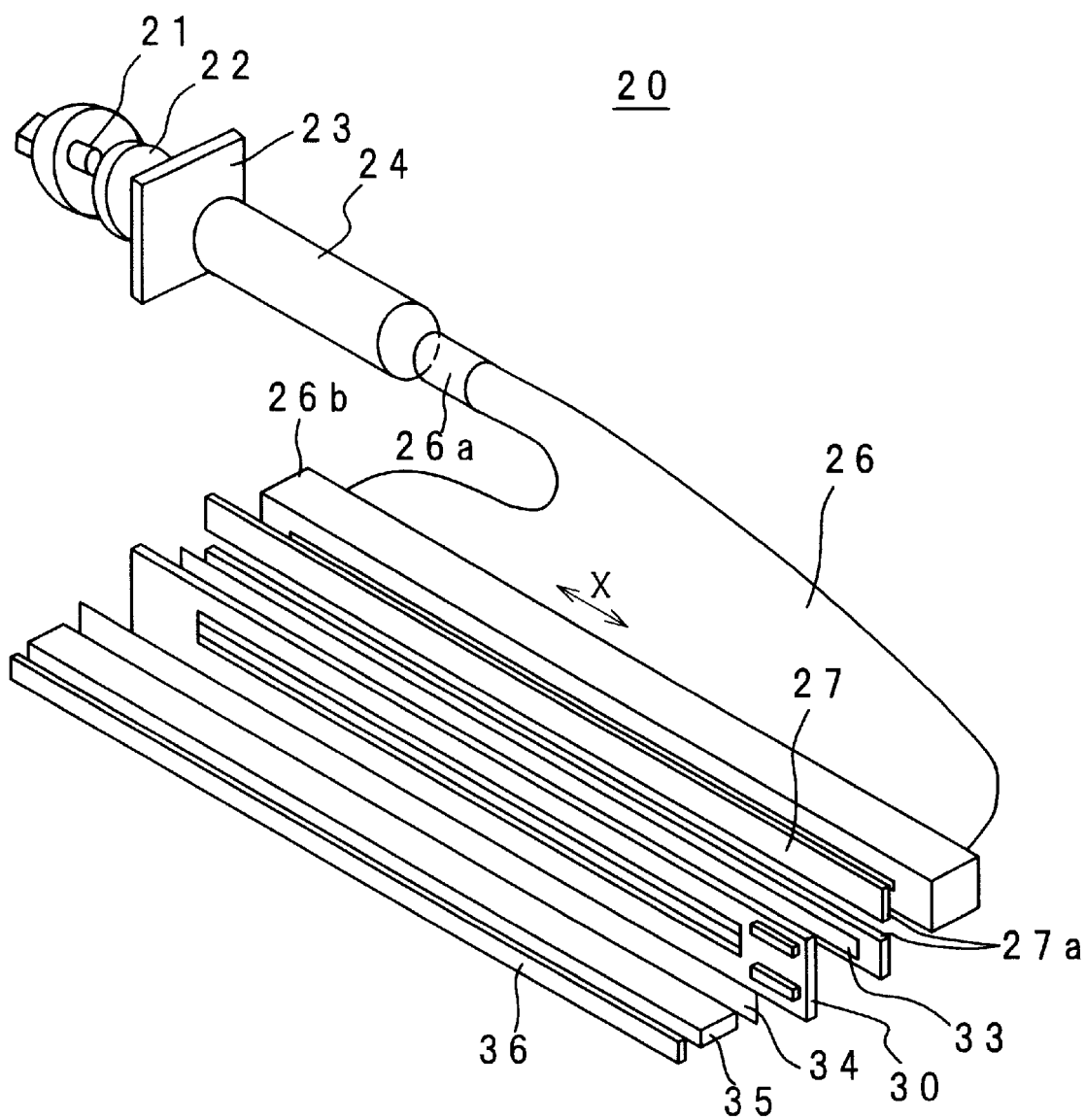
FIG. 2 is a perspective view of an optical write head provided in the color printer.

Hereinafter, embodiments of an image forming apparatus in accordance with the present invention is described with reference to the accompanying drawings.

First Embodiment

FIG. 1 shows schematic view of a color printer which is used to print photographs. This color printer comprises a photographic paper holding station 1, an exposing station 2, and a finishing station 3. A photographic paper 4 is held in the holding station 1 as a roll and pulled out to a looping stage 7 along guide rollers 5 and 6. In the exposing station 2, there are arranged three optical write heads 20 (20B, 20G, and 20R) shown in FIG. 2 and a light-quantity measuring unit 71 shown in FIGS. 5 and 6.

The photographic paper 4 is carried, with the photosensitive surface facing down, by a pair of carrying rollers 8 and 9, and then, is guided on the peripheral surface of the guide roller 10 toward the right hand side of the FIG. 1 at a constant speed. The photographic paper 4 is exposed by the light emitted from the optical write head 20, and is formed an electrostatic latent image. After the exposure, the photographic paper 4 is developed and cut in a specified size at the finishing station 3 and accumulated in a tray 19. Three optical write heads 20 expose the photographic paper 4 with lights of three primary colors, blue (B), green (G), and red (R), as synchronizing with the moving (sub scanning) speed of the photographic paper 4, and form a full-color image.

The optical write head 20 is explained hereinafter. As shown in FIG. 2, the optical write head 20 mainly comprises; a halogen lamp 21, a heat insulating filter 22, a color decomposing filter 23, a light dispersing cylinder 24, an optical fiber array 26, a slit plate 27, a light shutter module 30, an imaging lens array 35, and a dust protective glass 36.

A white light emitted from the halogen lamp 21 is cut its heat ray (infrared component of light) at the heat insulating filter 22 and decomposed in an each color of B, G, and R at the color decomposing filter 23. The light dispersing cylinder 24 is to improve the efficiency in use of light and reduce the unevenness in light quantity. Besides, it is desirable to provide a color correction filter and/or ND filter in a light source unit.

The optical fiber array 26 consists a large number of optical fibers; the optical fibers are bundled at one end 26a, and the end 26a faces the dispersing cylinder 24. The optical fibers are aligned at the other end 26b in the main scanning direction indicated by arrow X, so that light is emergent from the optical fiber array 26 linearly. The slit plate 27 has mirror surfaces 27a so as to guide the light emergent from the optical fiber array 26 to the light shutter module 30 efficiently. Further, a heater (not shown) which keeps the temperature of light shutter tips constant is provided to the slit plate 27; it controls the temperature of light shutter tips in accordance with a detection result of a thermometer (not shown) provided to the module 30.

The light shutter module 30 is provided an array of PLZT light shutter tips, each of which has shutter elements, on a slit of a ceramic substrate or on a glass substrate; and, driver ICs lined beside the array of PLZT light shutter tips. Each light shutter tip includes a plurality of light shutter elements being arranged in the longitudinal direction of the light shutter module 30. These light shutter elements will form pixels at a time of image formation. The light shutter elements are driven by the driver ICs based on a image data. Also, a polarizer 33 and an analyzer 34 are provided before and after the module 30 respectively. PLZT, as it is well-known, is a ceramic which has an electrooptic effect at a large Kerr constant and is light-transmitting. The polarization plane of the light linearly-polarized by the polarizer 33 rotates, which is caused by a turning-on and -off of an electric field generated by supplies of voltage to the light shutter element; consequently, the light emergent from the analyzer 34 is turned on and off. The light emergent from the analyzer 34 is transmitted through the imaging lens array 35 and the dust-protective glass 36, and is focused on the photographic paper 4 to form an elecrtostatic latent image.

Since the above-mentioned construction of the light shutter module has been described in detail in the U.S. Pat. No. 4,887,104, further explanation is omitted in this specification as referring to the disclosure of the U.S. Pat. No. 4,887,104.

The lights emergent from the optical write heads 20B, 20G, and 20R enter into a prism (dichroic prism or half-mirror prism) which functions as an optical path changing member 29 to be changed their direction toward the center of the guide roller 10, and are focused linearly on the photographic paper 4.

In the color printer according to the present embodiment, although a dichroic prism is preferable to be used as the optical path changing member 29, a half-mirror prism is also suitable. When using a half-mirror prism, light signals emergent from each optical write head 20B, 20G, and 20R needs to be blue, green, and red respectively. That is, the light color used for each optical write head 20B, 20G, and 20R must be blue coupling, green coupling, and red coupling respectively; alternatively, it is necessary to provide a blue filter, a green filter, and a red filter downstream of each light color.

The blue light signal, the green light signal, and the red light signal emergent from each optical write head 20B, 20G, and 20R, which are guided by the optical path changing member 29 to focus linearly on the photographic paper 4 as above-mentioned, are guided at substantially same angle against the photographic paper 4; in other words, the incident angle of these light signals against the photographic paper 4 are substantially equal. Usually, light from each light shutter element is projected as a minute area, not as a point, on the photographic paper 4. Therefore, as light incident angle against the paper 4 is different, the shape of an picture element will differ. For example, with an optical write head where light incident perpendicularly toward the photographic paper 4 forms a circle picture element, a picture element formed by light incident obliquely toward the paper 4 will be an ellipse. In this embodiment, since the blue, green, and red light signals emergent from each optical write head 20B, 20G, and 20R are guided at a substantially same angle, the pixel of each color can be formed in same shape. Therefore, comparing with a case that light signals are guided at different incident angles from each other to focus linearly on the photographic paper 4, the above-mentioned arrangement enables the pixel of each light color to have same shapes on the photographic paper 4, which is advantageous to form a high-quality image.

Hereinafter, the carrying method of the photographic paper 4 at the guide roller 10 and at the exposing station 2 is explained.

The guide roller 10, which comprises a cylinder and an shaft 10a therein, connecting to a guiding slot 11 on a fixed frame (not shown) is provided so as to be transferable between the exposure position indicated with continuous line and the upper position indicated with chain line in FIG. 1. The guide roller 10 can move to the exposure position by its own weight, but to move back to the upper position, it must either be lifted up by operator manually or be carried automatically by a drive source such as a motor.

Facing the guide roller 10 set on the exposure position, two positioning rollers 12 are provided so as to be rotatable. The positioning rollers 12 touch the guide roller 10 through the photographic paper 4 and position the guide roller 10 properly. By positioning rollers 12's controlling of the positioning of the guide roller 10 through the photographic paper 4 at the exposure position, the photosensitive surface can be adjusted to various photographic papers with different thicknesses to be held at the same position constantly; with such an arrangement, material with various thicknesses can be used as photographic paper. Therefore, image forming at high accuracy will be made possible by the photographic paper 4's being carried with being adhered to the curved section of the guide roller 10.

Further, an embodiment wherein the lights emergent from the optical write heads 20B, 20G, and 20R are guided by the optical path changing member 29 to align linearly, which differs from tandem method, contributes largely to the improvement of accuracy of image forming. Also, by providing the optical changing member 29, these optical write heads 20 are arranged efficiently so as to make good use of the space. Furthermore, for the purpose of ensuring the guide roller 10 to be accurately positioned at the exposure position, it is proper to provide a spring member (not shown) which, additional to the guide roller 10's own weight, assists the guide roller 10 to descend.

The photographic paper 4 is carried by rotating force of the carrying rollers 8 and 9 at the exposing station 2. To stabilize the carrying operation, it is desirable that the carrying speed of the carrying roller 9 is slightly faster than that of the carrying roller 8. As for the guide roller 10, either method will be suitable; a method where the guide roller 10 is driven to rotate by friction between the guide roller 10 and the photographic paper 4, or a method where the driving force is transmitted to the guide roller 10 to rotate.

The guide roller 10 is retreated to the upper position when setting the photographic paper 4, starting up the printer, and measuring light quantity by a light-quantity measuring unit 71 as explained below. When measuring light quantity, the guide roller 10 retreats upward to the upper position, and at the same time, the carrying roller 8 is rotated reverse to carry back the paper 4 to the looping stage 7.

As FIGS. 3 and 4 show, a link mechanism comprising a link lever 13 and guide plates 14 is provided to the guide roller 10. The link lever 13, whose vertical slit 13a is engaged with the shaft 10a, goes up and down on a stroke as shown in FIGS. 3 and 4 together with the guide roller 10's vertical motion. A guide plate 14, having a guide surface 14a whose length is same as that of the guide roller 10, is so fitted to swing freely on shafts 8a and 9a of the lower rollers of the carrying rollers 8 and 9. And pins 14b projecting out of the side of the guide plate 14 are engaged with horizontal slots 13b of the link lever 13, respectively.

In the arrangement explained above, when the guide roller 10 is set on the exposure position as shown in FIG. 3, as the link lever 13 is moving down, the guide plates 14 are turned along both sides of the guide roller 10, and the guide surfaces 14a guide the photographic paper 4 to be transported. And when the guide roller 10 retreats to the upper position as shown in FIG. 4, as the link lever 13 is moving up, the guide plates 14 are turned until they become horizontal below the guide roller 10. At this time, the guide surfaces 14a are placed substantially without space between them on the same level.

The guide roller 10 stays at the upper position when setting the photographic paper 4 or when waiting for exposure; and the guide surfaces 14a guide the leading edge of the photographic paper 4 while the photographic paper 4 is transported from the carrying roller 8 to the carrying roller 9. Also, the guide surfaces 14a function as a mechanical shutter against light leaking from the optical write heads 20B, 20G, and 20R when waiting for exposure. Accordingly, a mechanical shutter for the light source unit, which is usually provided to such an optical write head in order to prevent a fogging by light leaking, can be omitted in the first embodiment. Also, the guide surface 14a has a function of preventing the photographic paper 4 from being exposed by light leaking when measuring light quantity, as explained below.

Hereinafter, a light-quantity measuring unit 71 which measures light quantity outputted from each light shutter element of the optical write heads 20B, 20G, and 20R is explained.

Figure 5:
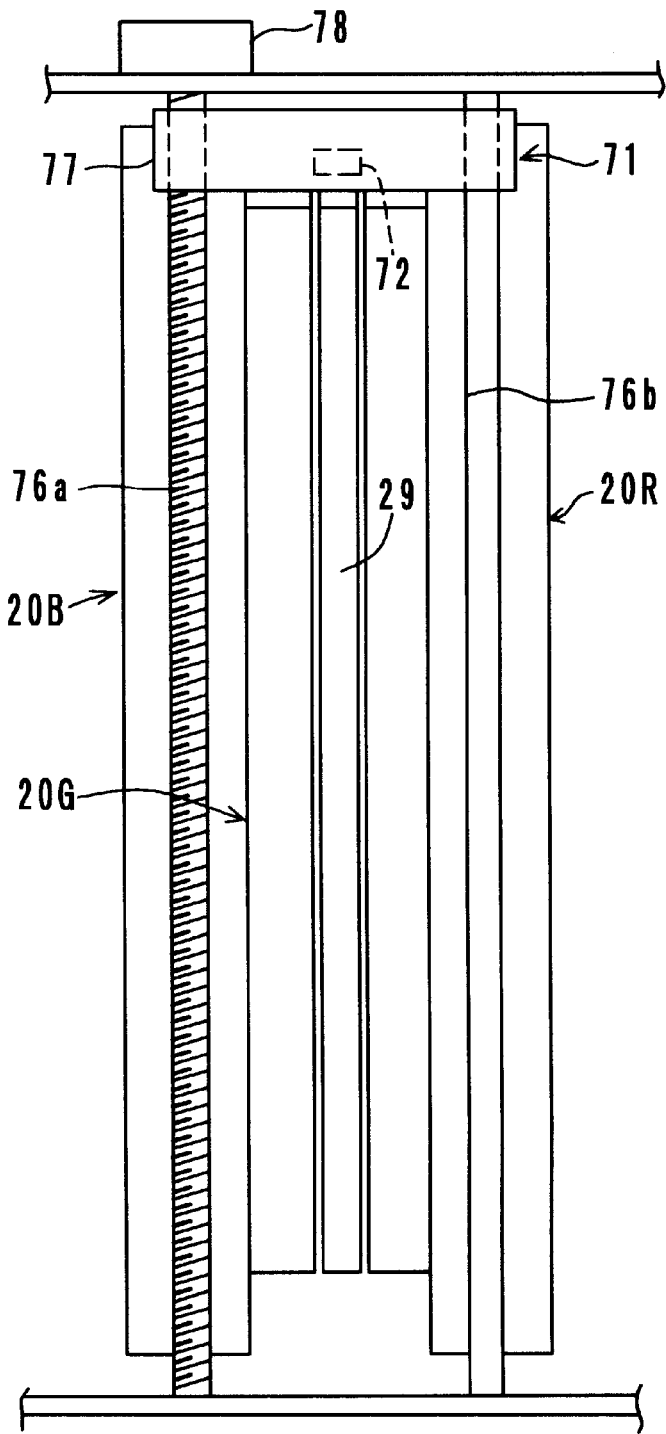
FIG. 5 is a plan view of the exposing station.

As shown in FIGS. 1 and 5, the light-quantity measuring unit 71 comprises a casing 77 and photoelectric conversion sensor 72 provided lower side of the casing 77, and is attached slidably to guide rods 76a and 76b. The guide rods 76a and 76b are arranged parallel to the main scanning direction; and the measuring unit 71 reciprocates at a constant speed in the main scanning direction while the sensor 72 is facing the light emitting position of the optical path changing member 29. The guide rod 76a is connected to a motor 78 with a male screw formed on its circumference, and a nut (not shown) provided to the casing 77 engages with the male screw.

The light-quantity measuring unit 71 ordinarily stays at a standby position, which is away from the main scanning area of the optical write head 20, shown with a solid line in FIG. 5, and is driven to reciprocate in the main scanning area by the guide rod 76a's reciprocal rotation driven by the motor 78 to measure light quantity emitted from the optical write heads 20B, 20G, and 20R. As afore-mentioned, when measuring light quantity, the guide roller 10 moves away upward from the exposure position. Namely, light-quantity measuring is carried out with the guide roller 10 moved away and the photographic paper 4 carried back to the looping stage 7 by the carrying rollers 8's reversion at a time of supplying new photographic paper 4, warming up the printer, and other specified time.

Figure 6A:
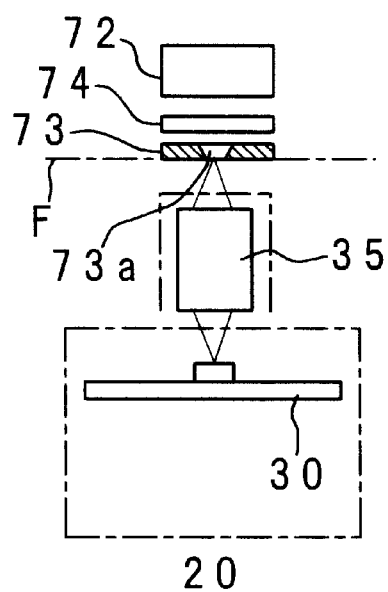
FIGS. 6a and 6b are illustrations showing the positional relationship between the optical write head and a light-quantity measuring unit respectively.

At the light incident side of the sensor 72, a slit plate 73 and a light dispersing plate 74 are provided as shown in FIG. 6a. The slit plate 73, having a slit 73a with a frontage which is 25 to 400% (preferably 50 to 200%) as wide as one element's width, is located on a focal plane F of the imaging lens array 35. For the sensor 72 to be used, its spectral-response characteristic needs to be substantially equal to, or to have wider range than that of the photographic paper 4.

Figure 6B:
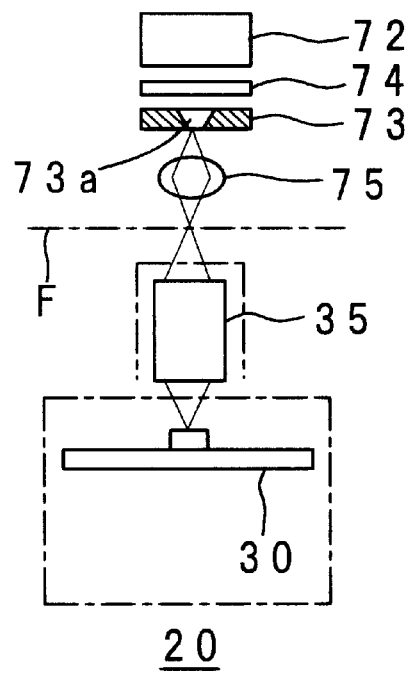

Also, as shown in FIG. 6b, it is possible to further provide a lens 75 between the imaging lens array 35 and the slit plate 73. By providing the lens 75, the light-quantity measuring unit 71 can move away from the focusing surface F.

The light-quantity measuring unit 71 and the optical write heads 20 in the embodiment explained above are controlled by a sequencer; the reciprocal movement of the measuring unit 71 and the timing of the measurement of light quantity are controlled, and the light quantity emitted from the optical write heads 20B, 20G, and 20R are measured one by one. The optical write head 20 is driven at a pre-programmed mode (driving frequency, duty, and on/off data) when measuring light quantity. The measuring unit 71 integrates measured values with respect to each light shutter element in synchronization with the programmed drive. Usually, in consideration of the relationship between the driving frequency of the optical write head 20 and the driving speed of the sensor 72, ten and several times of samplings/holds from each light shutter element are carried out. The output of the sensor 72 is subjected to A/D conversion and is transmitted to a control section for necessary processing.

The driving mode of the optical write head 20 is set in accordance with the driving conditions of an actual apparatus which has the optical write heads. Here, a case wherein the optical write head 20 has a printing density of 400 dpi (dot number per inch) and is employed in a printer which is driven at a frequency of 1 kHz, that is, which has a system speed of 63.5 mm/s is described.

First, while light shutter elements on odd numbers in the light shutter array are turned on and off repeatedly, the sensor 72 moves forward from an initial position which is outside the scanning area. The outputs of the sensor 72 during an on-period (1 msec) are integrated, and the integrated value is sampled/held and subjected to A/D conversion and is sent to the control section. When the sensor 72 is moved at a speed of 1 mm/s, since the printing density of the optical write head 20 is 400dpi (63.5 $\mu$m), 63.5 times of samplings/holds from each light shutter element (one pixel) are carried out. After moving the sensor 72 by a distance a little longer than the main scanning length, data sending to the control section is stopped, and the sensor 72 is returned to the initial position. Next, while light shutter elements on even numbers in the light shutter array are turned on and off repeatedly, the light-quantity measurement and data input are carried out in the above-described manner. In this way, all the light shutter elements are subjected to the light-quantity measurement. Of course, it is possible to carry out the light quantity measurement of the light shutter elements on even numbers at the return movement of the sensor 72, which is more efficient.

An effective measuring way for light-quantity correction is to collect values from each light shutter element in four different conditions. That is to drive the optical write head 20 at duties of high, middle, low and off-state. In this case, approximately 16 times of samplings/holds from one light shutter element in each condition of the four levels are carried out during one scan (a one-way movement of the sensor 72). It is possible to carry out the four-level light-quantity measurement during two to four scans. Also, the number of levels of the duty is not necessarily to be four.

The number of samplings/holds from each light shutter element can be increased by lowering the speed of the sensor 72 or by heightening the driving frequency of the optical write head 20. It cannot be said that there is no change in quantity of light outputted from each light shutter element caused by a change in driving frequency of the optical write head 20, but the change is small enough to be allowable. If the correlation between the driving frequency and the quantity of light is made clear beforehand, the change in quantity of light with a change in driving frequency can be handled by using a correction coefficient.

In the control section, from a peak value of the inputted data, the address and light quantity of the element is figured out. Then, when light quantity is measured at four levels, measured quantities of light at the four levels are expressed by approximate cubic curves, and correction coefficients at each level (for example, 0 to 255 tone levels) are determined.

Figure 7:
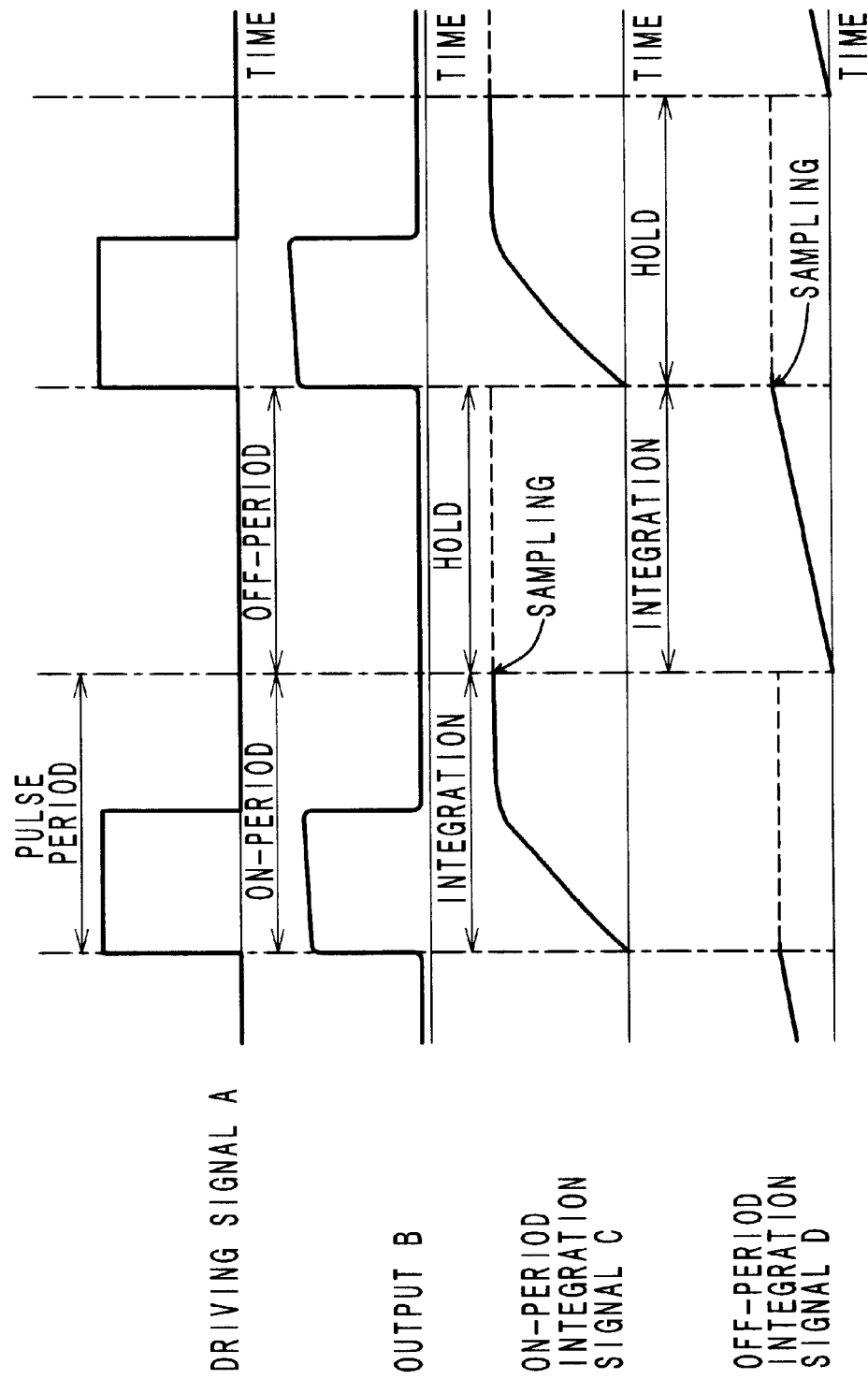
FIG. 7 is a chart showing waveforms of analog signals during light-quantity measurement.
Figure 8:
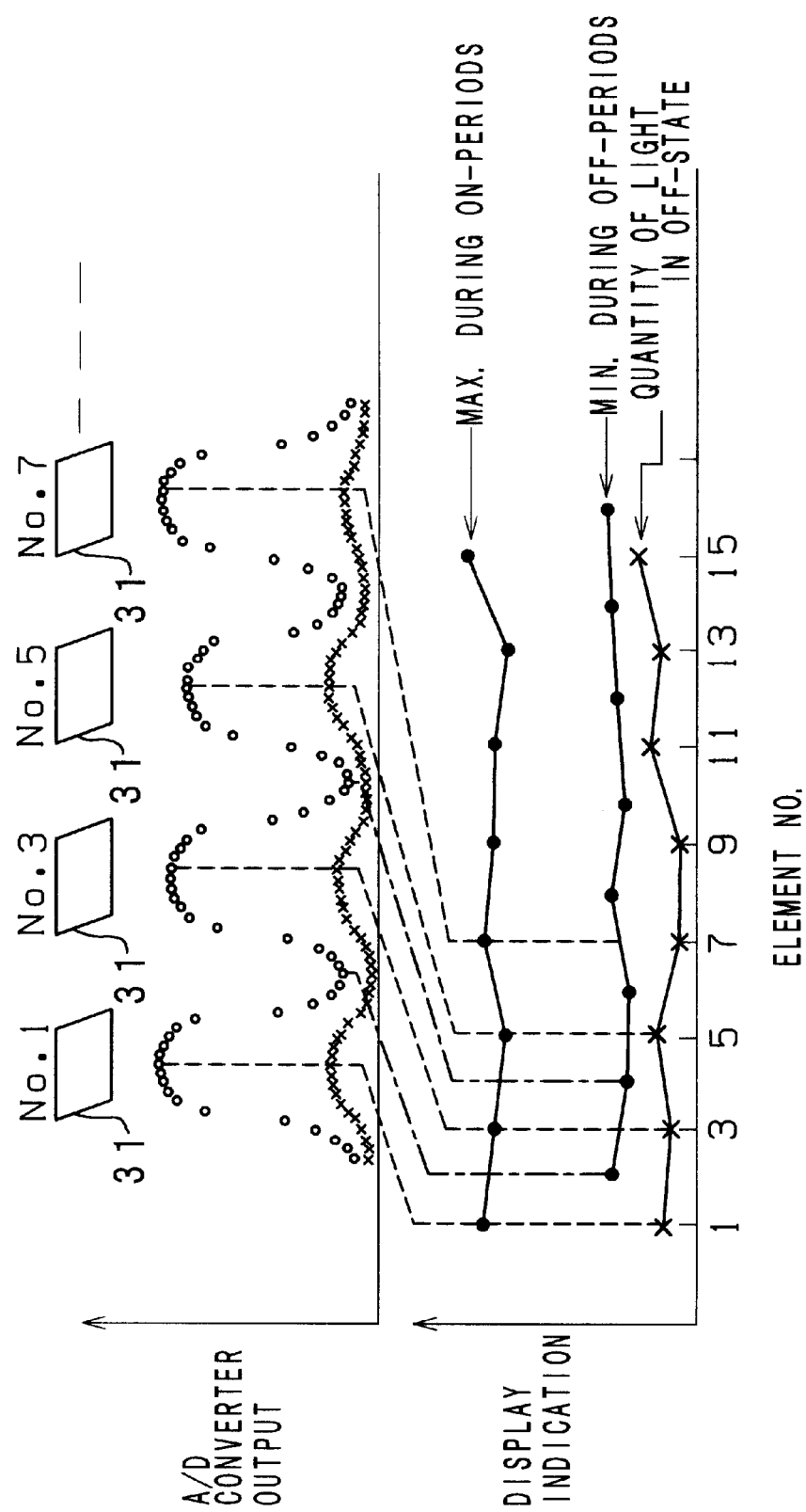
FIG. 8 is a chart showing waveforms of digital signals during the light-quantity measurement.

Next, referring to FIGS. 7 and 8, the principle of the light-quantity measurement during thin-out driving is described.

First, a driving signal A is applied to light shutter elements on odd numbers in the light shutter array. The driving signal A has a frequency and a duty which are equal or nearly equal to the driving conditions of an actual apparatus which the optical write head 20 is employed in. Each light shutter element makes an output B, and the sensor 72, which is moving forward in the main scanning direction X, outputs a waveform indicating the output B. Values detected by the sensor 72 during an on-period is integrated, and after the on-period, the integrated value is sampled/held and subjected to A/D conversion.

In the measurement, since the slit 73a which has a width substantially equal to that of light shutter element is moved in the main scanning direction X at such a speed as to carry out a plurality of samplings from each light shutter element, the output after the A/D conversion is as shown in FIG. 8. When the sensor 72 comes to a position exactly opposite to a drive light shutter element 31, the sensor 72 detects the maximum quantity of light, and when the sensor 72 comes to a position between adjacent drive light shutter elements 31, the sensor 72 detects the minimum quantity of light. Accordingly, from the position of a peak of the output waveform of the sensor 72, the address of a light shutter element 31 on odd number can be recognized. The minimum quantity of light detected between the driven light shutter elements 31 depends on the MTF of the imaging lens, the width of the slit 73a, etc. With carrying out the measurement for the light shutter elements on even numbers in the same manner described above, the light-quantity measurement for all light shutter elements is completed.

In the above-described measurement, since the positions of the light shutter elements are found out based on the output of the sensor 72, it is not necessary to monitor the initial position of the sensor 72 and an encoder. In this first embodiment, the sensor 72 can detect the quantities of light both in periods of the on-state and in periods of the off-state simultaneously, and the driving signal A is to drive each light shutter element to come to an on-state and an off-state alternately.

The quantity of light in an off-period (the quantity of leakage light) is measured in the same manner as that in an on-period. Specifically, values detected by the sensor 72 during the off-period is integrated, and after the off-period, the integrated value is sampled/held and subjected to A/D conversion. It is possible to find out the address of a light shutter element based on the outputs of the sensor 72 during the off-periods; however, because the outputs of the sensor 72 during the off-periods are small, the address of a light shutter element is determined from the position of the maximum output of the sensor 72 during the on-periods of the light shutter element, and an output during an off-period adjacent to the on-period when the sensor 72 outputs the maximum value is taken as the quantity of light in its off-state.

In a case of light quantity correction, a light quantity of a specified light shutter element is needed to be determined with, not only the maximum light quantity in on-period, but also the quantity of leakage light (light quantity in off-period) and the quantity of entering light (the minimum light quantity in on-period) from an adjacent light shutter element. Thus, it is preferred to correct light quantity by using the following expression:

quantity of light outputted from a light shutter element=maximum quantity of light measured from the element+(quantity of entering light−quantity of leakage light)×correction coefficient The correction coefficient, which depends on the driving pattern of the light shutter elements and the width of the slit 73a, is within a range from 0.2 to 1.0. When line/dot images (sharp images) are to be formed, it is sufficient to carry out a light-quantity correction to each light shutter element only in accordance with the maximum quantity of light measured from a specified element. Further, in a case of reproducing one dot (a pixel), the light-quantity correction only in accordance with the maximum quantity of light measured from a specified element is preferred.

Although a pattern of driving every other dot is adopted in the above-described measuring method, various driving patterns are possible; for example, thin-out driving of each one from a specified numbered elements, and addressing a driven element from its peak value. Since the interval between light shutter elements has been set at the time of producing the apparatus, an undriven element is addressed by dividing the peak value equally by the interval of the thin-out driving.

Figure 9:
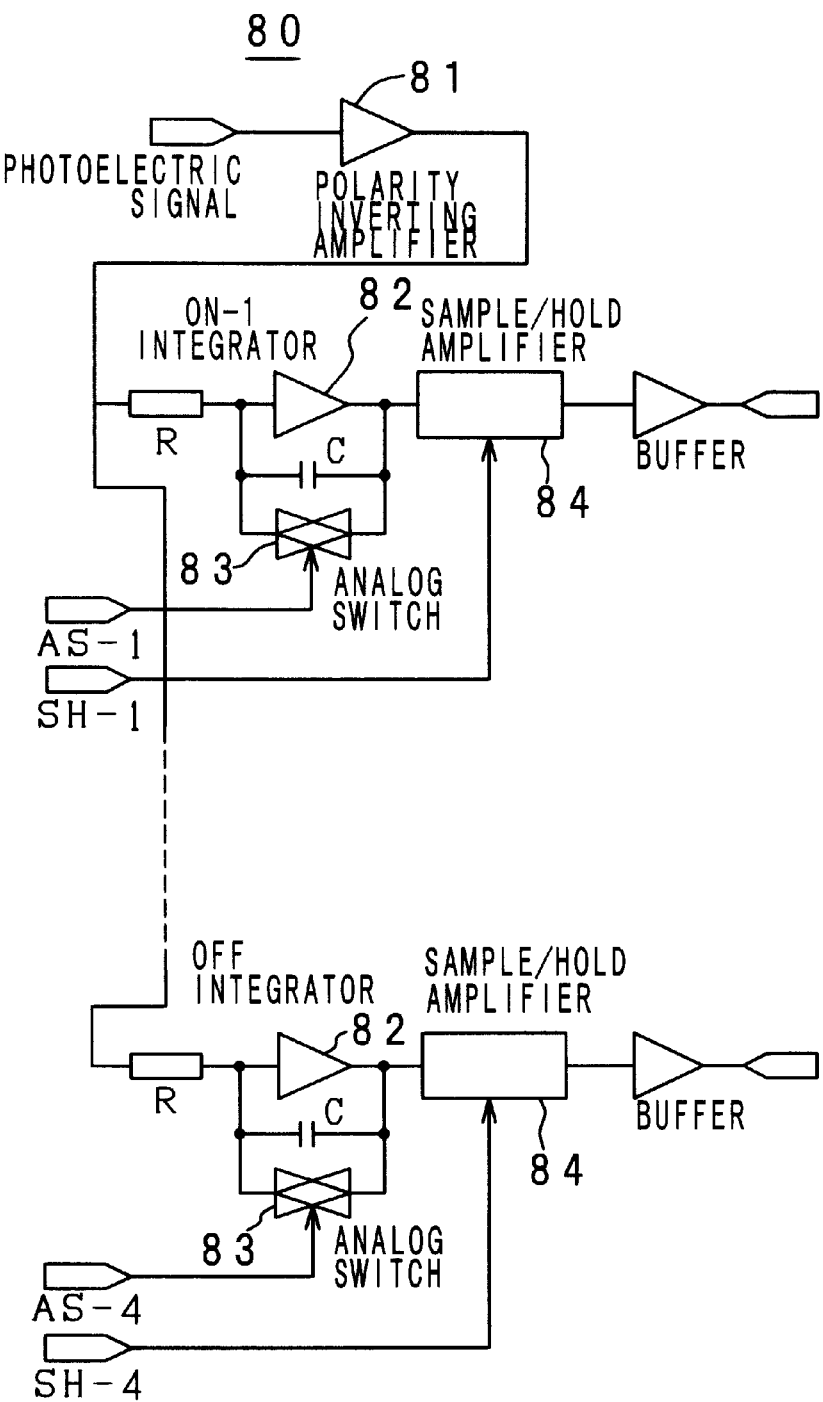
FIG. 9 is a block diagram of an integrating circuit for the light-quantity measurement.
Figure 10:
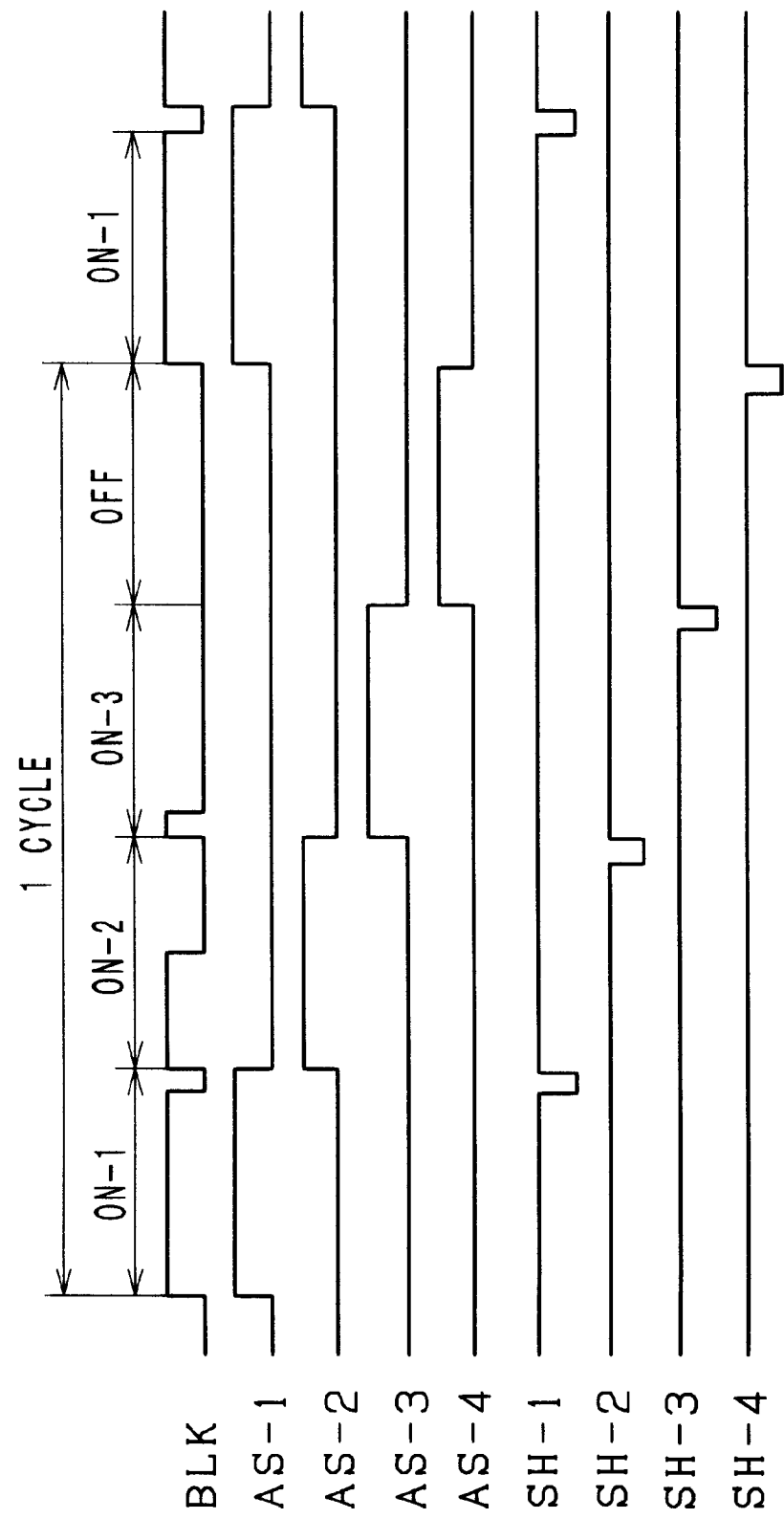
FIG. 10 is a timing chart showing the operation of the integrating circuit.

FIG. 9 shows an integrating circuit 80, and FIG. 10 shows a timing chart.

The integrating circuit 80 is to measure the quantities of light outputted from each light shutter element at different four levels—at a high duty, at a middle duty, at a low duty and at an off level—and is composed of four lines (FIG. 9 shows only two of the four). A photoelectric signal outputted from the sensor 72 is inputted to each integrator 82 via a polarity inverting amplifier 81. Further, the signal is sent to a sample/hold amplifier 84 and is subjected to A/D conversion. The photoelectric signal is subjected to integration in the integrator 82 while an analog switch 83 is kept on in response to the corresponding one of signals AS-1 though AS-4. The integrated value is held in the sample/hold amplifier 84 when the corresponding one of signals SH-1 through SH-4 drops and is converted into a digital signal by an A/D converter (not shown).

With this integrating circuit 80, the quantities of light outputted from each light shutter element at four levels can be measured during one scan. From these measured values, approximate expressions to indicate the light quantity characteristics of the light shutter elements are calculated, and a light quantity correction table is made based on the expressions. Thus, a suitable light-quantity correction can be made to each light shutter element for formation of a quality multi-tone image.

Now, the driver ICs which drive the optical write head 20 are described.

The thin-out driving of the light shutter elements for the light-quantity measurement can be realized by transmitting necessary data from the CPU to drive the optical write head 20. However, this function can be imparted to the driver ICs.

Figure 11:
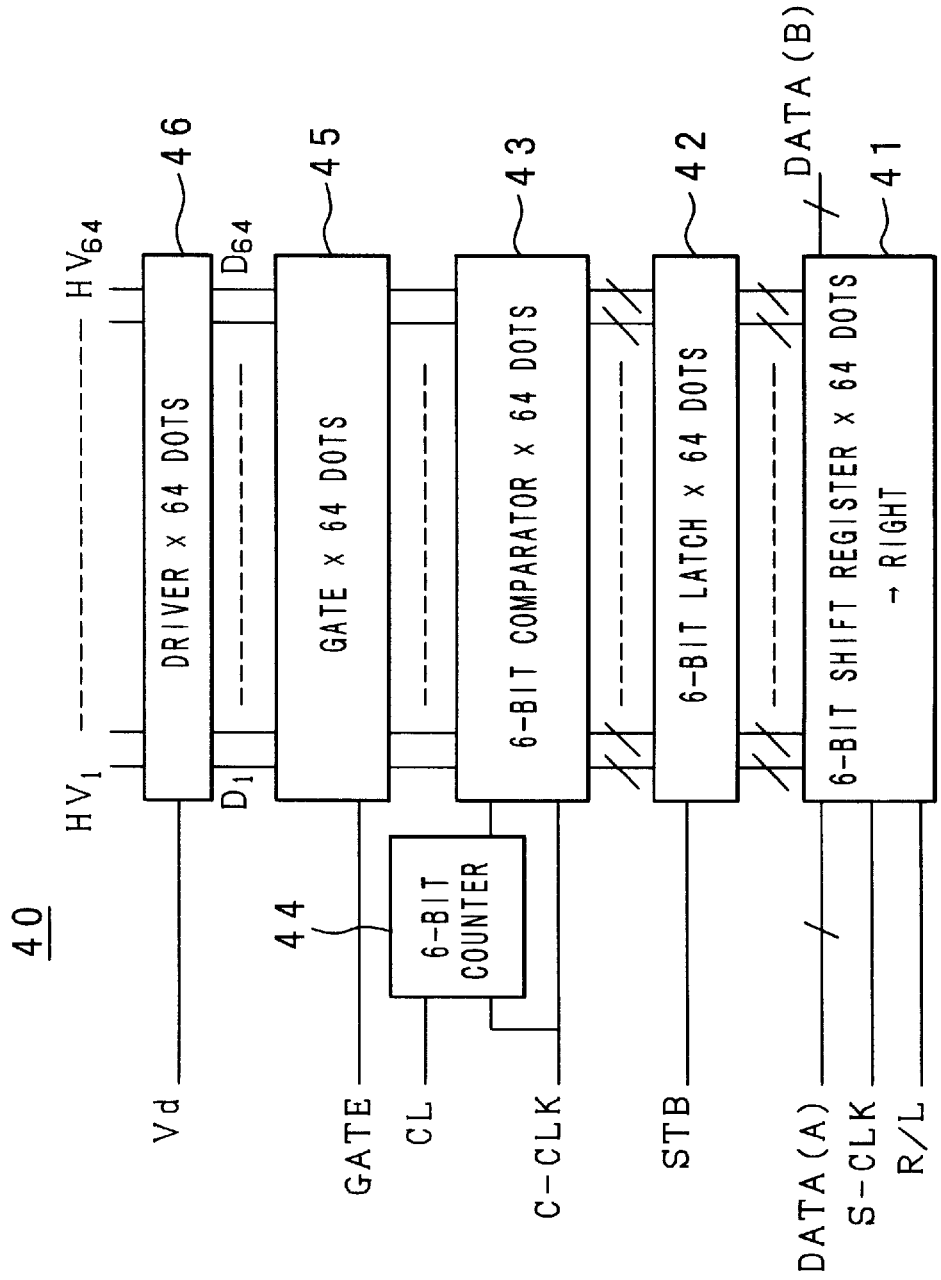
FIG. 11 is a block diagram of a driver IC for multi-value image formation.
Figure 12:
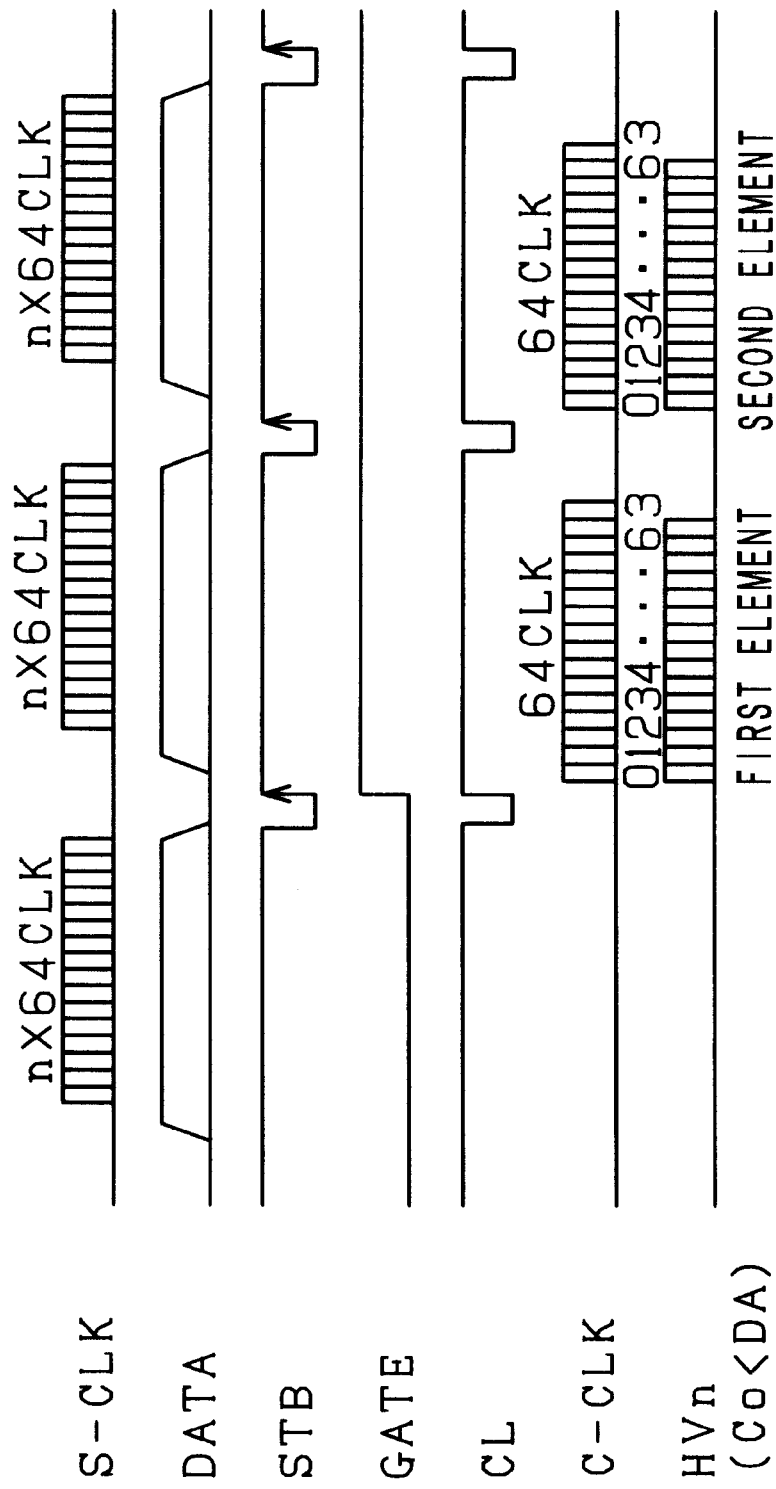
FIG. 12 is a timing chart showing the operation of the driver IC for multi-value image formation.

FIG. 11 shows the structure of a driver IC 40 which is a type for formation of multi-value images, and FIG. 12 shows a timing chart. The driver IC 40, where n number of ICs are connected to each other by a ladder chain, is to drive 64 light shutter elements, and comprises a 6 bit shift register 41, a 6 bit latch circuit 42, a 6 bit comparator 43, a 6 bit counter 44, a gate circuit 45, and a driver circuit 46.

Image data DATA(A) and DATA(B) are shifted into the shift register 41 based on a shift signal R/L in synchronization with a shift clock signal S-CLK and are latched in the latch circuit 42 controlled by a strobe signal STB. Thereby, the tone level of each pixel is set. The counter 44 counts the clock signal C-CLK, and the comparator 43 compares the counter value with the latched value. When the both values become equal, the gate circuits 45 stops the output. The counter 44 is cleared on receiving a clear signal CL.

A driving voltage Vd is applied to the driver circuit 46, and the driver circuit 46 outputs $HV_1$ through $HV_{64}$ to the shutter elements. The pulse widths of $HV_1$ through $HV_{64}$ are set in accordance with signals $D_1$ through $D_{64}$ sent from the gate circuit 45. Thus, each light shutter element is turned on for a time (pulse width) in accordance with image data DATA for the corresponding pixel.

In control of the light-quantity measurement toward an optical write head with the multi-tone driver ICs 40, a specified quantity of light to be outputted from each light shutter element is commanded by a data signal DATA by use of a dip switch or the like. The data signal DATA is sent to the shift register 41 and latched controlled by the strobe signal STB, and a duty in accordance with the data signal DATA is produced in the comparator 43. Then, specified light shutter elements are driven to output the specified quantity of light controlled by a data signal GATE. Such signals for thin-out driving are repetitious signals and are produced in a comparatively simple circuit.

In the structure wherein the light shutter elements are arranged in two lines staggeringly, that is, in a line of odd numbers and in a line of even numbers, the thin-out driving can be carried out by setting the data signal DATA to be sent to one of the lines at "H" level, which is simpler control. In order to vary the quantity of light to be outputted from each light shutter element, the setting of the dip switch is changed.

In the color printer, the power switch is turned on and a temperature of developing solution is controlled automatically by setting a timer. During this warm-up period, the high-quantity measurement for light shutter elements and their correction (calibration) are carried out in accordance with the width of set photographic paper. The calibration is, as afore-mentioned, a process of driving an optical write head 20 under a substantially same condition as that of exposure, and correcting the light quantity based on the outputted light quantity. Accordingly, an excellent tonal image without unevenness is produced.

In the above-described light-quantity measuring method with thin-out driving, the address of each light shutter element is determined based on the output of the sensor 72 without using any special devices for determination on the address. Therefore, when the measuring device 70 is used to test an optical write head, by counting the number of samplings between peaks of the output waveform, trouble of the optical write head (pitch error, errors in alignment of the light shutter elements, etc.) can be detected. Also, when the measuring unit 71 is employed in a printer provided with an optical write head, by counting the number of samplings between peaks, abnormal movement of the measuring unit 71 can be detected. In case of abnormal movement of the measuring unit 71, such abnormality is displayed and warned, and the printer is stopped. Further, when the measuring unit 71 is employed in a printer, light-quantity correction which copes with aging of the light shutter elements becomes possible.

Image data for printing read by a film scanner (not shown) are unfolded on a bit map memory of the image memory. Corrections are made to the data on the bit map memory referring to the look-up table which stores light-quantity correction data, and the corrected data are transmitted to the driver of the light shutter module 30. Thus, an image with a density equal to that of the original image can be reproduced while the light color is switched at a specified speed.

In this first embodiment, it is also possible, while printing an image by the optical write head 20, to irradiate light from the optical write head 20 to the sensor 72 included in the light quantity measuring unit 71 which is set on the side position indicated in FIG. 5. Definitely, drive a dummy light shutter element added to the light shutter module 30 under a specified condition (duty and frequency), and guide the output light to the sensor 72; or, guide a light emergent from the halogen lamp 21 to the sensor 72 via a light guide fiber (not shown). With such an arrangement, the light quantity of the optical write head 20 can be monitored at a time of image writing. Therefore, image writing can be more stable by correcting light quantity at appropriate times or giving a warning upon comparing of the light quantity of the optical write head with a standard light quantity.

In this first embodiment as described above, one light-quantity measuring unit 71 wherein one sensor 72 is held in the casing 77 is provided for the three optical write heads 20B, 20G, and 20R, and it is driven by the motor 78. Consequently, a device for measuring light quantity can be simplified and installed into a printer at a low cost.

The first embodiment is so arranged that the light-quantity measuring is carried out in a thin-out driving method, which is driving pixels on odd numbers and that on even numbers by turns; however, not only thin-out driving method, but various methods of light-quantity measuring can be employed.

Second Embodiment

The second embodiment is a case where the optical write head in the first embodiment is applied to an electrophotographic printer. An electrostatic latent image is formed on a photosensitive belt 301 by three optical write heads 201, 202, and 203 which are shifted by one third of a pixel in the main scanning direction via the optical path changing member 29; then, a developed toner image is transferred on a sheet S being carried in the direction of the arrow d in FIG. 13.

That is, with an arrangement of plural optical write heads 201, 202, and 203 to be shifted in the main scanning direction, a high density image writing whose density is multiplier of the number of write optical heads can be realized even with a use of light shutter elements of low density; and, with a measurement of light quantity, each head can be located properly and light quantity can be adjusted properly. In this embodiment, although a half mirror is preferable for the optical path changing member 29, it is also possible to use a dichroic mirror for the optical path changing member 29 if the photosensitive belt 301 has an even sensitivity over wide spectral area.

The photosensitive belt 301 is so held by guide rollers 302 and 303 that it is driven to rotate endlessly in the direction of the arrow e, and around the belt 301, there are a charger 311, a developer 312, a transfer roller 313, and a toner cleaner 314 provided. The guide roller 302 has the same function as the guide roller 10 of the first embodiment has, and has a construction at least where the guide rollers 302 and 303 and the transfer roller 313 is movable up and down, and the guide roller 302 can move away upward from the exposure position. Also, the guide roller 302 is adjusted its position to the exposure position by the positioning rollers 12.

Further, a exposing station 310 is provided a link mechanism (not shown) which is similar to the one in the first embodiment (link lever 13 and guide plate 14), and a light-quantity measuring unit 71 which measures light quantity of each optical write head 201, 202, and 203. The light-quantity measuring unit 71 also has the same construction as the one shown in FIG. 5, and measures light quantity in the same manner.

As described above, a plurality of optical write heads can be used not only for multi-color image forming, but for high density image forming.

Other Embodiments

As well as the PLZT light shutter array, LEDs (light emitting diodes), LCSs (liquid crystal shutters), a DMD (deformable mirror device), an FLD (fluorescent device), etc. can be used as the optical array of an optical write head.

The exposure position of the guide roller 10 and 302 can be set either with a mechanism where the thickness of a recording medium is detected automatically, then inputted by an operator so that the exposure position is automatically set, or with a mechanism where an operator inputs the exposure position manually. In such cases, the positioning rollers 12 are not necessarily provided. Further, it is also possible to fix the exposure position of the guide roller 10 and 302, and make the optical write head movable as a whole corresponding to the thickness of a recording medium.

Also, the light-quantity measuring unit may be driven by any mechanism such as one using a belt and a wire as well as the mechanism wherein a guide shaft is rotated by a motor.

Further, the present invention is applicable to an image projector which projects an image onto a display as well as to an image forming apparatus which forms an image on a silver-salt print sheet and an image forming apparatus which forms an image on an electrophotographic photosensitive member.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An image forming apparatus comprising:
   a plurality of light signal emitting heads each of which comprises:
      an array of a plurality of light signal emitting elements;
      driver ICs, which are connected to said light signal emitting elements, for driving said light signal emitting elements individually to emit light signals in accordance with image data; and an array of a plurality of imaging lenses for imaging the light signals emitted from said plurality of light signal emitting elements, wherein said light signal emitting heads are arranged so that light signals from said plurality of light signal emitting heads are emitted toward a combining position with substantially different angles;

an optical element, which is provided at the combining position for combining the light signals from the plurality of light signal emitting heads and leading the light signals to an exposure position with substantially identical incident angles for light emitted from each of the plurality of light signal emitting heads; and a transporter for transporting a flexible image receiving member, the transporter having a guide member at said exposure position, said guide member being for defining a path of the image receiving member at said exposure position by contacting with the image receiving member.

2. An image forming apparatus as claimed in claim 1, wherein colors of the light signals emitted from said plurality of light signal emitting heads are mutually different.

3. An image forming apparatus as claimed in claim 2, wherein said optical element includes a half mirror.

4. An image forming apparatus as claimed in claim 1, wherein colors of the light signals emitted from said plurality of light signal emitting heads are identical.

5. An image forming apparatus as claimed in claim 4, wherein said optical element includes a dichroic prism.

6. An image forming apparatus as claimed in claim 1, wherein each of said light signal emitting elements is made of a material having an electro-optical effect.

7. An image forming apparatus as claimed in claim 1, wherein said guide member is a roller.

8. An image forming apparatus as claimed in claim 7, wherein:

said roller is one of a plurality of rollers; and the image receiving member is in a form of a belt supported by said rollers.

9. An image forming apparatus as claimed in claim 1, wherein the image receiving member is in a form of sheet.

10. An image forming apparatus comprising:

a plurality of light signal emitting heads each of which has an array of a plurality of light signal emitting elements, each light signal emitting element of said plurality of light signal emitting elements being individually driven for emitting light signals in accordance with image data;

an optical element which combines, the light signals from the plurality of light signal emitting heads and leads the light signals to an exposure position with substantially identical incident angles for light emitted from each of the plurality of light signal emitting heads;

a guide which guides an image receiving member at the exposure position; and a first mechanism which selectively moves said guide between a first position and a second position different from said first position, wherein said guide guides the image receiving member to said exposure position when said guide is set at said first position by said first mechanism.

11. An image forming apparatus as claimed in claim 10, further comprising:

a measuring unit which measures intensities of light signals emitted from said light signal emitting heads at said exposure position, said measuring unit including a sensor for sensing the intensities and a second mechanism for moving said sensor in a main scanning direction of said optical element, wherein said second mechanism moves said sensor when said guide is set at said second position by said first mechanism.

12. An image forming apparatus comprising:

a light signal emitting head which has an array of a plurality of light signal emitting elements for emitting light signals;

an optical element which leads the light signals to an exposure position;

a guide which guides an image receiving member at the exposure position;

a sensor which senses intensities of the light signals emitted from said light signal emitting head at the exposure position; and a mechanism which selectively sets said guide and said sensor to the exposure position.

13. An image forming apparatus as claimed in claim 12, said mechanism including:

a first mechanism for moving said guide; and a second mechanism for moving said sensor.

14. An image forming apparatus as claimed in claim 13, wherein said second mechanism moves said sensor in a main scanning direction of said optical element.

15. An image forming apparatus as claimed in claim 14, wherein said second mechanism moves said sensor in the main scanning direction at said exposure position.

16. An image forming apparatus as claimed in claim 13, wherein said first mechanism moves said guide between a first position and a second position different from said first position, wherein said guide guides said image receiving member when said guide is set at said first position by said first mechanism.

17. An image forming apparatus as claimed in claim 12, wherein each of said light signal emitting elements is made of a material having an electro-optical effect.

18. An image forming apparatus comprising:

a plurality of light signal emitting heads which drive a plurality of optical elements extending in a main scanning direction each optical element of said plurality of optical elements being individually driven in accordance with image data;

an optical path changing member which guides light emergent from said light signal emitting heads to align on a substantially same line;

a guide member which guides on its arched curving section a flexible image receiving member which moves in a sub scanning direction on an image focusing position of the light guided by said optical path changing member, said arched curving section of said guide member being located at said focusing position; and an exposure adjuster for displacing either said guide member or each of said light signal emitting heads corresponding to a thickness of said image receiving member.

19. An image forming apparatus comprising:

a plurality of light signal emitting heads which drive a plurality of optical elements extending in a main scanning direction, each optical element of said plurality of optical elements being individually driven in accordance with image data;

an optical path changing member which guides light emergent from said light signal emitting heads to align on a substantially same line;

a guide member which guides on its arched curving section a flexible image receiving member which moves in a sub scanning direction on an image focusing position of the light guided by said optical path changing member, said arched curving section of said guide member being located at said focusing position; and a holder for holding said guide member, wherein said guide member can move toward or away from an exposure position.

20. An image forming apparatus as claimed in claim 19 further comprises a positioning member for touching and stopping said guide member through said image receiving member when said guide member is set on the exposure position.

21. An image forming apparatus as claimed in claim 19 further comprises a light-quantity measuring unit having a light-receiving element for receiving light emergent from each of said light signal emitting heads, the light quantity measuring unit which moves said light-receiving element in the main scanning direction when said guide member is set at a retreat position.

\* \* \* \* \*